US007001528B2

(12) United States Patent
Laubender et al.

(10) Patent No.: US 7,001,528 B2
(45) Date of Patent: Feb. 21, 2006

(54) USE OF AQUEOUS BINDERS IN PRODUCING FILTER MATERIALS

(75) Inventors: Matthias Laubender, Schifferstadt (DE); Matthias Gerst, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/774,422

(22) Filed: Feb. 10, 2004

(65) Prior Publication Data

US 2005/0075440 A1 Apr. 7, 2005

(30) Foreign Application Priority Data

Mar. 11, 2003 (DE) ................. 103 10 882

(51) Int. Cl.
*B01D 37/02* (2006.01)
*B01D 39/08* (2006.01)
*B01J 20/22* (2006.01)
*B01J 20/26* (2006.01)
*C08F 265/04* (2006.01)

(52) U.S. Cl. .................. 210/777; 210/192; 210/193; 210/506; 210/507; 210/508; 264/628; 427/244; 524/460; 526/203

(58) Field of Classification Search ............. 210/777, 210/192, 193, 506, 507, 508; 264/628; 427/244; 524/460; 526/203
See application file for complete search history.

(56) References Cited

U.S. PATENT DOCUMENTS

| | | | |
|---|---|---|---|
| 4,623,462 A * | 11/1986 | Urig et al. ........... | 210/496 |
| 5,661,213 A | 8/1997 | Arkens et al. | |
| 5,763,524 A | 6/1998 | Arkens et al. | |
| 6,071,994 A | 6/2000 | Hummerich et al. | |
| 6,136,916 A | 10/2000 | Arkens et al. | |
| 6,221,973 B1 | 4/2001 | Arkens et al. | |
| 6,262,159 B1 * | 7/2001 | Dreher et al. ........... | 524/245 |
| 6,841,608 B1 * | 1/2005 | Dreher et al. ........... | 524/457 |

FOREIGN PATENT DOCUMENTS

| | | |
|---|---|---|
| DE | 199 49 592 | 4/2001 |
| EP | 0 445 578 | 9/1991 |
| EP | 0 583 086 | 2/1994 |
| EP | 1 018 523 A2 | 7/2000 |
| WO | WO 97/31036 | 8/1997 |
| WO | WO 01/27163 A1 | 4/2001 |
| WO | WO 200127163 A1 * | 4/2001 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The use of an aqueous polymer dispersion comprising dispersed particles of at least one polymer A1 obtainable by free-radical emulsion polymerization in the presence of a polymer A2 synthesized from from 50 to 99.5% by weight of at least one ethylenically unsaturated monocarboxylic and/or dicarboxylic acid, from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group, up to 20% by weight of at least one further monomer as a binder for producing filter materials.

22 Claims, No Drawings

USE OF AQUEOUS BINDERS IN PRODUCING FILTER MATERIALS

The present invention relates to the use of an aqueous polymer dispersion comprising dispersed particles of at least one polymer A1 obtainable by free-radical emulsion polymerization in the presence of a polymer A2 synthesized from
- from 50 to 99.5% by weight of at least one ethylenically unsaturated monocarboxylic and/or dicarboxylic acid,
- from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group,
- up to 20% by weight of at least one further monomer as a binder in producing filter materials.

Sheetlike structures, such as fiber webs or papers, or moldings, such as fiberboard or chipboard, are frequently consolidated chemically using a polymeric binder. The forms in which the polymeric binders can be used include those of an aqueous solution or aqueous dispersion.

EP-A-445 578 discloses plates made of finely divided materials, such as glass fibers, in which mixtures of high molecular mass polycarboxylic acids and polyhydric alcohols, alkanolamines or polyfunctional amines act as binders.

EP-A-583 086 discloses, for example, aqueous binders for producing fiber webs, especially glass fiber webs. The binders comprise a polycarboxylic acid having at least two carboxylic acid groups and also, if desired, anhydride groups, and a polyol. These binders require a phosphorus-containing reaction accelerator in order for the glass fiber webs to attain sufficient strengths. It is remarked that the presence of such a reaction accelerator can only be dispensed with by using a highly reactive polyol. As highly reactive polyols mention is made of β-hydroxyalkylamides.

EP-A 882 074 describes binders for moldings that are composed of a polymer obtained by free-radical polymerization of an unsaturated acid anhydride or unsaturated dicarboxylic acid with an alkanolamine. Binders of this kind are applied, inter alia, to fiber webs which serve as support materials in coating operations.

DE-A 19949592 relates to aqueous polymer solutions comprising dissolved particles of at least one polymer of ethylenically unsaturated carboxylic acids, esters of unsaturated carboxylic acids, and further monomers. Aqueous polymer solutions of this kind are likewise used, inter alia, as binders for fiber webs made, for example, of cellulose.

Neither EP-A 882 074 nor DE-A 19949592, however, discloses using such aqueous solutions or such aqueous polymer dispersions, respectively, as binders for producing filter materials.

Binders for filter materials such as filter paper or filter cloth must impart to the substrate qualities including high mechanical stability (tensile strength, bursting strength), particularly after storage under damp conditions at elevated temperature. Binders of this kind are further required to ensure high chemical resistance, under the action of solvents for example, and ought to have very little effect, if any, on the permeability (pore size) of the filter material.

In the manufacture of filter materials, binders having a very high acid group content have occasionally to date been found disadvantageous on account of the fact that filter materials based on cellulose fibers and consolidated with these binders occasionally have a reduced stability, which is manifested, among other things, in reduced bursting strength in long-term testing or after storage at elevated temperature.

It is an object of the present invention to remedy the disadvantages depicted and to provide an improved binder for filter materials which is distinguished by qualities including high mechanical stability and chemical resistance and which as far as possible has no effect on the permeability of the filter materials. The present invention also extends to the filter materials provided with the improved binders.

We have found that this object is achieved by the use of an aqueous polymer dispersion comprising dispersed particles of at least one polymer A1 obtainable by free-radical emulsion polymerization in the presence of a polymer A2 synthesized from
- from 50 to 99.5% by weight of at least one ethylenically unsaturated monocarboxylic and/or dicarboxylic acid,
- from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group,
- up to 20% by weight of at least one further monomer as a binder for producing filter materials.

In connection with the monomer components of the polymer A1, alkyl below is preferably straight-chain or branched $C_1$–$C_{22}$ alkyl, especially $C_1$–$C_{12}$ alkyl, and very preferably $C_1$–$C_6$ alkyl, such as methyl, ethyl, n-propyl, n-butyl, sec-butyl, tert-butyl, n-pentyl, n-hexyl, 2-ethylhexyl, n-dodecyl or n-stearyl. Hydroxyalkyl is preferably hydroxy-$C_1$–$C_6$ alkyl, the alkyl radicals being straight-chain or branched, and in particular 2-hydroxyethyl, 2- or 3-hydroxypropyl, 2-methyl-2-hydroxypropyl, and 4-hydroxybutyl. Cycloalkyl is preferably $C_5$–$C_7$ cyclohexyl, especially cyclopentyl and cyclohexyl. Aryl is preferably phenyl or naphthyl.

The polymer A1 is a free-radical emulsion polymer. It can be prepared using any monomers polymerizable by free-radical polymerization. Generally the polymer is synthesized from
- from 80 to 100% by weight, preferably from 85 to 99.9% by weight, based on the total weight of the monomers for the polymer, of at least one ethylenically unsaturated principal monomer, and
- from 0 to 20% by weight, preferably from 0.1 to 15% by weight, based on the total weight of the monomers for the polymer, of at least one ethylenically unsaturated comonomer.

The principal monomer is preferably selected from
- esters of preferably C3 to C6 α,β-monoethylenically unsaturated monocarboxylic or dicarboxylic acids, such as acrylic acid, methacrylic acid, maleic acid, fumaric acid, and itaconic acid, with $C_1$–$C_{12}$, preferably $C_1$–$C_8$ alkanols. Particular such esters include methyl, ethyl, n-butyl, isobutyl, tert-butyl, n-pentyl, isopentyl, and 2-ethylhexyl acrylate and/or methacrylate;
- vinylaromatic compounds, preferably styrene, α-methylstyrene, o-chlorostyrene, and vinyltoluene;
- vinyl esters of $C_1$–$C_{18}$ monocarboxylic or dicarboxylic acids, such as vinyl acetate, vinylpropionate, vinyl n-butyrate, vinyl laurate and/or vinyl stearate;
- butadiene;
- linear 1-olefins, branched-chain 1-olefins or cyclic olefins, such as ethene, propene, butene, isobutene, pentene, cyclopentene, hexene or cyclohexene. Also suitable are oligoolefins having a terminal double bond and prepared with metallocene catalysis, such as oligopropene or oligohexene;

acrylonitrile and methacrylonitrile;

vinyl and allyl alkyl ethers having 1 to 40 carbon atoms in the alkyl radical, it being possible for the alkyl radical to carry further substituents, such as one or more hydroxyl groups, one or more amino or diamino groups or one or more alkoxylate groups, such as, for example, methyl vinyl ether, ethyl vinyl ether, propyl vinyl ether, and 2-ethylhexyl vinyl ether, isobutyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers;

and mixtures thereof.

Particularly preferred principal monomers are styrene, methyl methacrylate, n-butyl acrylate, ethyl acrylate, 2-ethylhexyl acrylate, vinyl acetate, ethene, and butadiene, and mixtures thereof.

The comonomer is preferably selected from ethylenically unsaturated monocarboxylic or dicarboxylic acids or their anhydrides, preferably acrylic acid, methacrylic acid, methacrylic anhydride, maleic acid, maleic anhydride, fumaric acid and/or itaconic acid;

acrylamides and alkyl-substituted acrylamides, such as acrylamide, methacrylamide, N,N-dimethylacrylamide, N-methylolmethacrylamide, N-tert-butylacrylamide, and N-methylmethacrylamide;

monomers containing sulfo groups, such as allylsulfonic acid, methallylsulfonic acid, styrenesulfonic acid, vinylsulfonic acid, 2-acrylamido-2-methylpropanesulfonic acid, allyloxybenzenesulfonic acid, the corresponding alkali metal or ammonium salts thereof, and mixtures thereof, and also sulfopropyl acrylate and/or sulfopropyl methacrylate;

$C_1$–$C_4$ hydroxyalkyl esters of $C_3$–$C_6$ monocarboxylic or dicarboxylic acids, especially of acrylic acid, methacrylic acid or maleic acid, or their derivatives alkoxylated with from 2 to 50 mol of ethylene oxide, propylene oxide, butylene oxide or mixtures thereof, or esters of said acids with $C_1$–$C_{18}$ alcohols alkoxylated with from 2 to 50 mol of ethylene oxide, propylene oxide, butylene oxide or mixtures thereof, such as, for example, hydroxyethyl acrylate, hydroxyethyl methacrylate, hydroxypropyl acrylate, hydroxypropyl methacrylate, butane-1,4-diol monoacrylate, ethyldiglycol acrylate, methylpolyglycol acrylate (11 EO), and (meth)acrylic esters of $C_{13}$/$C_{15}$ oxoalcohol reacted with 3, 5, 7, 10 or 30 mol of ethylene oxide;

vinylphosphonic acids and their salts, dimethyl vinylphosphonate, and other phosphorus-containing monomers;

alkylaminoalkyl (meth)acrylates or alkylaminoalkyl (meth)acrylamides or their quaternization products, such as 2-(N,N-dimethylamino)ethyl (meth)acrylate or 2-(N,N,N-trimethylammonio)ethyl methacrylate chloride, 3-(N,N-dimethylamino)propyl (meth)acrylate, 2-dimethylaminoethyl (meth)acrylamide, 3-dimethylaminopropyl (meth)acrylamide, 3-trimethylammoniopropyl (meth)acrylamide chloride;

allyl esters of $C_1$–$C_{30}$-monocarboxylic acids;

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, 2-vinylpyridine, 4-vinylpyridine, N-vinylcarbazole and/or N-vinylcaprolactam;

diallyldimethylammonium chloride, vinylidene chloride, vinyl chloride, acrolein, and methacrolein;

monomers containing 1,3-diketo groups, such as acetoacetoxyethyl (meth)acrylate or diacetoneacrylamide, monomers containing urea groups, such as ureidoethyl (meth)acrylate, acrylamidoglycolic acid, and methacrylamidoglycolate methyl ether;

monomers containing silyl groups, such as trimethoxysilylpropyl methacrylate;

monomers containing glycidyl groups, such as glycidyl methacrylate;

and mixtures thereof.

Particularly preferred comonomers are hydroxyethyl acrylate, hydroxypropyl acrylate, hydroxybutyl acrylate, hydroxyethyl methacrylate, and mixtures thereof. Special preference is given to hydroxyethyl acrylate and hydroxyethyl methacrylate, particularly in amounts of from 2 to 20% by weight, based on the total monomers A1.

The polymer A2 contains from 50 to 99.5% by weight, preferably from 70 to 99% by weight, of incorporated structural units derived from at least one ethylenically unsaturated monocarboxylic or dicarboxylic acid. Within the polymer these acids if desired may also be present in whole or in part in the form of a salt. The acidic form is preferred.

The solubility of the polymer A2 in water is preferably more than 10 g/l (at 25° C.).

Ethylenically unsaturated carboxylic acids which can be used have already been mentioned above in connection with the polymer A1. Preferred carboxylic acids are $C_3$ to $C_{10}$ monocarboxylic acids and $C_4$ to $C_8$ dicarboxylic acids, particularly acrylic acid, methacrylic acid, crotonic acid, fumaric acid, maleic acid, 2-methylmaleic acid and/or itaconic acid. Particular preference is given to acrylic acid, methacrylic acid, maleic acid, and mixtures thereof. In the preparation of the polymer A2 it is of course possible, instead of the acids or together with the acids, to use their anhydrides, such as maleic anhydride, acrylic anhydride or methacrylic anhydride.

The polymer A2 further contains in copolymerized form from 0.5 to 50% by weight, preferably from 1 to 30% by weight, of at least one ethylenically unsaturated compound selected from the esters of ethylenically unsaturated monocarboxylic acids and the monoesters and diesters of ethylenically unsaturated dicarboxylic acids with at least one hydroxyl-containing amine.

The polymer A2 is preferably a comb polymer having covalently bonded amine side chains.

Monocarboxylic acids suitable as a component of the esters are the abovementioned $C_3$ to $C_{10}$ monocarboxylic acids, especially acrylic acid, methacrylic acid, crotonic acid, and mixtures thereof.

Dicarboxylic acids suitable as a component of the monoesters and diesters are the abovementioned $C_4$ to $C_8$ dicarboxylic acids, especially fumaric acid, maleic acid, 2-methylmaleic acid, itaconic acid, and mixtures thereof.

The amine having at least one hydroxyl group is preferably selected from secondary and tertiary amines containing at least one $C_6$ to $C_{22}$ alkyl, $C_6$ to $C_{22}$ alkenyl, aryl-$C_6$ to $C_{22}$ alkyl or aryl-$C_6$ to $C_{22}$ alkenyl radical, the alkenyl group having 1, 2 or 3 nonadjacent double bonds.

The amine is preferably hydroxyalkylated and/or alkoxylated. Alkoxylated amines preferably have one or two alkylene oxide radicals with terminal hydroxyl groups. The alkylene oxide radicals each contain from 1 to 100, preferably from 1 to 50, identical or different alkylene oxide units, distributed at random or in the from of blocks. Preferred alkylene oxides are ethylene oxide, propylene oxide and/or butylene oxide. Ethylene oxide is particularly preferred.

The polymer A2 preferably contains in incorporated form an unsaturated compound based on an amine component comprising at least one amine of the formula (I)

$$R_c\text{NR}^a R^b \qquad (I)$$

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, the alkenyl radical having 1, 2 or 3 nonadjacent double bonds, $R^a$ is hydroxy-$C_1$–$C_6$ alkyl or a radical of the formula II $$-(CH_2CH_2O)_x(CH_2CH(CH_3)O)_y-H \qquad (II)$$

where in the formula II the sequence of the alkylene oxide units is arbitrary and x and y independently are an integer from 0 to 100, preferably from 0 to 50, the sum of x and y being >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, the alkenyl radical having 1, 2 or 3 nonadjacent double bonds, or $R^b$ is a radical of formula III $$-(CH_2CH_2O)_v(CH_2CH(CH_3)O)_n-H \qquad (III)$$

where in the formula III the sequence of the alkylene oxide units is arbitrary and v and w independently are an integer from 0 to 100, preferably from 0 to 50.

$R^c$ is preferably $C_8$ to $C_{20}$ alkyl or $C_8$ to $C_{20}$ alkenyl, the alkenyl radical having 1, 2 or 3 nonadjacent double bonds. $R^c$ is preferably the hydrocarbon radical of a saturated or monounsaturated or polyunsaturated fatty acid. Examples of preferred radicals $R^c$ include n-octyl, ethylhexyl, undecyl, lauryl, tridecyl, myristyl, pentadecyl, palmityl, margarinyl, stearyl, palmitoleyl, oleyl, and linolyl.

With particular preference the amine component is an alkoxylated fatty amine or an alkoxylated fatty amine mixture. The ethoxylates are particularly preferred. Use is made in particular of alkoxylates of amines based on naturally occurring fatty acids, such as tallow fatty amines, which contain predominantly saturated and unsaturated $C_{14}$, $C_{16}$, and $C_{18}$ alkylamines, or cocoamines, containing saturated, monounsaturated, and diunsaturated $C_6$–$C_{22}$, preferably $C_{12}$–$C_{14}$ alkylamines. Examples of amine mixtures suitable for alkoxylation are various Armeen® grades from Akzo or Noram® grades from Ceca.

Suitable alkoxylated amines available commercially are, for example, the Noramox® grades from Ceca, preferably ethoxylated oleylamines, such as Noramox® 05 (5 EO units), and the BASF AG products sold under the brand name Lutensol®FA.

Copolymerization of the aforementioned esters, monoesters, and diesters generally has the effect of producing pronounced stabilization of the polymer dispersions for use in accordance with the invention. These dispersions reliably retain the colloidal stability of their latex particles on dilution with water or dilute electrolytes or surfactant solutions.

The esterification to prepare the aforedescribed esters, monoesters, and diesters takes place in accordance with customary methods known to the skilled worker. To prepare esters of unsaturated monocarboxylic acids the free acids or suitable derivatives, such as anhydrides, halides, e.g., chlorides, and ($C_1$ to $C_4$) alkyl esters, can be used. Monoesters of unsaturated dicarboxylic acids are preferably prepared from the corresponding dicarboxylic anhydrides. The reaction takes place preferably in the presence of a catalyst, such as a dialkyl titanate or an acid, such as sulfuric acid, toluenesulfonic acid or methanesulfonic acid. The reaction takes place in general at temperatures from 60 to 200° C. In one suitable embodiment the reaction takes place in the presence of an inert gas, such as nitrogen. Water formed in the course of the reaction can be removed by appropriate measures, such as by distillation, from the reaction mixture. The reaction may be desired to take place in the presence of customary polymerization inhibitors. The esterification reaction can be conducted to substantial completion or only up to a partial conversion. If desired, one of the ester components, preferably the hydroxyl-containing amine, can be employed in excess. The extent of esterification can be determined by means of infrared spectroscopy.

In one preferred embodiment the unsaturated esters, monoesters or diesters are prepared and reacted further, to give the polymers A2 used in accordance with the invention, without the esters being isolated between preparation and further reaction, which are preferably conducted one after the other in the same reaction vessel.

To prepare the polymers A2 it is preferred to use a reaction product of a dicarboxylic anhydride, preferably maleic anhydride, and one of the aforedescribed hydroxyl-containing amines.

Besides the carboxylic acid and ester, monoester and/or diester constituents it is possible for the polymer A2 further to contain in copolymerized form from 0 to 20% by weight, preferably from 0.1 to 10% by weight, of other monomers. Useful monomers are those specified in connection with the polymer A1, particular preference being given to vinylaromatics, such as styrene, olefins, such as ethylene, or (meth) acrylic esters such as methyl (meth)acrylate, ethyl (meth) acrylate, n-butyl (meth)acrylate, 2-ethylhexyl (meth) acrylate, and mixtures thereof.

The polymers A2 are prepared preferably by free-radical polymerization in bulk or in solution. Suitable solvents for the solution polymerization are, for example, water, water-miscible organic solvents, such as alcohols and ketones, for example, methanol, ethanol, n-propanol, isopropanol, n-butanol, acetone, methyl ethyl ketone, etc., and mixtures thereof. Examples of suitable polymerization initiators include peroxides, hydroperoxides, peroxodisulfates, percarbonates, peroxo esters, hydrogen peroxide, and azo compounds, as described in more detail below for the preparation of polymer dispersions. The polymers A2 can be prepared separately if desired and purified and/or isolated by a conventional method. It is preferred to prepare the polymers A2 immediately before preparing the polymer dispersions for use in accordance with the invention and to use them without interim isolation for the dispersion polymerization.

The polymers A2 can also be prepared with advantage by polymer-analogous reaction. This can be done by reacting a polymer incorporating from 80 to 100% by weight of at least one ethylenically unsaturated monocarboxylic and/or dicarboxylic acid and from 0 to 20% by weight of the aforementioned other polymers with at least one hydroxyl-containing amine.

Suitable ethylenically unsaturated monocarboxylic and dicarboxylic acids are those specified above as a component of the polymers A1 and A2. Suitable amines containing at least one hydroxyl group are again those specified above. In the polymer used for the polymer-analogous reaction the acids may if desired be present in whole or in part in the form of a derivative, preferably a $C_1$ to $C_6$ alkyl ester.

Preparing the polymers A2 by polymer-analogous reaction is effected preferably in a suitable nonaqueous solvent or in bulk. In the case of reaction in bulk the amine component can be used if desired in excess, so as to act as solvent. Preferred solvents are those which form an azeotrope with water and so make it easy to remove the water formed in the course of the reaction. The reaction takes place preferably in the presence of an esterification catalyst, as described above. The reaction temperature is preferably from 100 to 200° C. Water formed in the course of the reaction can be removed by appropriate measures, such as by distillation.

The weight ratio of polymer A1 to polymer A2, based on solids, is preferably from 9:1 to 1:9, in particular from 3:1 to 1:3.

Besides the polymers A1 and A2 the latices of the invention can also contain from 0 to 50% by weight, preferably from 0.1 to 40% by weight, based on the polymer A2, of at least one surface-active, alkoxylated—preferably ethoxylated or propoxylated—alkylamine. Preferred alkylamines are those of the formula $R^cNR^aR^b$, as defined above, which are also present in the polymer A2, particular preference being given to alkylamines of the formula

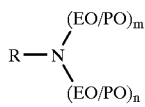

where R is an alkyl, alkenyl or alkylvinyl radical having at least 6 carbon atoms and m and n independently are $\geq 1$. Preferred radicals R have 8 to 22 carbon atoms.

The alkoxylated alkylamines in the polymer A2 and the additional alkylamine crosslinkers can be the same or different compounds.

The polymer dispersion for use in accordance with the invention may if desired comprise further crosslinkers, such as an amine or amide crosslinker having at least two hydroxyl groups. Suitable crosslinkers are especially the alkanolamines disclosed in DE-A 197 29 161, which are hereby made—by reference—part of the disclosure content of the present invention.

Suitable crosslinkers with further preference are β-hydroxyalkylamines of the formula

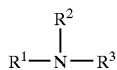

where $R^1$ is a hydrogen atom, a $C_1$ to $C_{10}$ alkyl group, a $C_1$ to $C_{10}$ hydroxyalkyl group or a radical of the formula IV $$-(CH_2CH_2O)_x(CH_2CH(CH_3)O)_y-H \qquad (IV)$$

where in formula IV the sequence of the alkylene oxide units is arbitrary and x and y independently are an integer from 0 to 100, the sum of x and y being >1, and $R^2$ and $R^3$ independently are a $C_1$ to $C_{10}$ hydroxyalkyl group.

More preferably $R^2$ and $R^3$ independently are a $C_2$ to $C_5$ hydroxyalkyl group and $R^1$ is a hydrogen atom, a $C_1$ to $C_5$ alkyl group or a $C_2$ to $C_5$ hydroxyalkyl group.

Particular preference is given to diethanolamine, triethanolamine, diisopropanolamine, triisopropanolamine, methyldiethanolamine, butyldiethanolamine and methyldiisopropanolamine, especially triethanolamine.

Further preferred β-hydroxyalkylamines are the amines disclosed as component A in DE-A 196 21 573, which are hereby made—by reference—part of the disclosure content of the present invention. They include preferably linear or branched aliphatic compounds containing per molecule at least two functional amino groups of type (a) or (b)

in which R is hydroxyalkyl and R' is alkyl, preferably a compound of the formula I'

where

A is $C_2$–$C_{18}$ alkylene which is unsubstituted or substituted by one or more groups selected independently from alkyl, hydroxyalkyl, cycloalkyl, OH, and $NR^6R^7$, where $R^6$ and $R^7$ independently are H, hydroxyalkyl or alkyl, and which is uninterrupted or interrupted by one or more oxygen atoms and/or groups $NR^5$ in which $R^5$ is H, hydroxyalkyl, $(CH_2)_nNR^6R^7$, in which n is 2 to 5 and $R^6$ and $R^7$ as defined above, or alkyl, which in turn can be interrupted by one or more groups $NR^5$ in which $R^5$ is as defined above, and/or substituted by one or more groups $NR^6R^7$ in which $R^6$ and $R^7$ are as defined above;

or A is a radical of the formula:

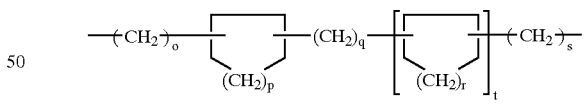

where o, q, and s independently are 0 or an integer from 1 to 6, p and r independently are 1 or 2, and t is 0, 1 or 2, it being possible for the cycloaliphatic radicals also to be substituted by 1, 2 or 3 alkyl radicals, and $R^1$, $R^2$, and $R^3$ and $R^4$ independently of one another are hydrogen, hydroxyalkyl, alkyl or cycloalkyl.

Preferred higher polyfunctional β-hydroxyalkylamines are in particular at least diethoxylated amines having a molar weight of below 1 000 g/mol, such as diethanolamine, triethanolamine, and ethoxylated diethylenetriamine, preferably stoichiometrically ethoxylated diethylenetriamine, i.e., diethylenetriamine in which all of the NH hydrogen atoms are on average monoethoxylated.

Highly suitable additional crosslinkers are also β-hydroxyalkylamides, preferably the β-hydroxyalkylamides specified in U.S. Pat. No. 5,143,582 of the formula

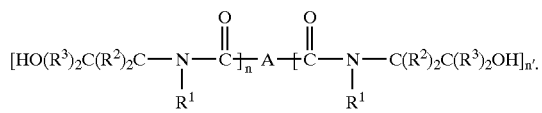

Particular preference is given to the β-hydroxyalkylamides of the above formula in which $R^1$ is hydrogen, a short-chain alkyl group or $HO(R^3)_2C(R^2)_2C—$, n and n' are each 1, -A- is a $—(CH_2)_m—$ group, m is from 0 to 8, preferably from 2 to 8, each $R^2$ is hydrogen, and one of the $R^3$ groups is hydrogen and the others are hydrogen or $C_1–C_5$ alkyl. Bis[N,N-di(2-hydroxyethyl)]adipamide is particularly preferred.

The addition of the crosslinker generally has the effect of improving the curing of the compositions for use in accordance with the invention at a given curing temperature or of allowing curing at lower temperature for a given curing time. The weight fraction of the crosslinker relative to the sum of polymer A1 and A2 is from 0 to 50% by weight, preferably from 0.1 to 30% by weight.

The polymer dispersions for use in accordance with the invention may also have a reaction accelerator added to them. Preferred such accelerators are phosphorus compounds, especially hypophosphorous acid and its alkali metal and alkaline earth metal salts, or alkali metal tetrafluoroborates. Additionally, the salts of Mn(II), Ca(II), Zn(II), Al(III), Sb(III) or Ti(IV), or strong acids, such as para-toluenesulfonic acid, trichloroacetic acid, and chlorosulfonic acid, can be added as reaction accelerators. The weight fraction of the reaction accelerator relative to the sum of polymer A1 and A2 is from 0.1 to 5% by weight, preferably from 0.1 to 2% by weight.

Particularly preferred compositions of the polymer dispersions for use in accordance with the invention are from 70 to 45% by weight of polymer A1, from 25 to 55% by weight of polymer A2, and, if desired, from 0 to 10% by weight of surface-active alkoxylated alkylamine, from 0 to 30% by weight of hydroxyl-containing crosslinker, from 0 to 5% by weight of reaction accelerator.

The polymer dispersion for use in accordance with the invention is prepared preferably by aqueous emulsion polymerization, for which a batch, semicontinuous or continuous procedure is possible. It has proven advantageous to meter the polymer A2 into the reaction vessel in the form of an emulsion feed together with the monomers of the polymer A1. If desired, the monomers which form polymer A1, and the polymer A2, can be supplied to the reaction vessel in whole or in part by way of two or more separate feeds and, where appropriate, without intimate mixing, by way of common feeds or a plurality of feeds, separate where appropriate. The monomers can be supplied to the reaction vessel either preemulsified or without prior emulsification. In one preferred embodiment at least part of the polymer A2 is supplied to the reaction vessel together with at least one monomer component of A1. Advantageously, this generally produces aqueous polymer dispersions whose viscosity is lower than that of conventional dispersions. All or some of the polymer A2 can be used as an initial reactor charge, and in portions it can also be added after the end of the reaction. Using a defined amount of a seed latex as initial reactor charge is advantageous for the polymer dispersions used in accordance with the invention, for the setting of a specific particle size distribution. In this case from 0 to 25% by weight, preferably from 0.1 to 10% by weight, based on the polymer A1, of a suitable seed latex can be used.

The polymer dispersion is generally prepared in water as dispersing medium. Alternatively it is possible for water-miscible organic solvents, such as alcohols and ketones, e.g., methanol, ethanol, n-propanol, isopropanol, n-butanol, acetone or methyl ethyl ketone, to be present in a fraction of up to approximately 30% by volume.

The polymer A1 accordingly is prepared by aqueous emulsion polymerization in the presence of the polymer A2 and, where present, preferably in the presence of a surface-active amine, as described above.

Emulsifiers can be added to the dispersions to be used.

Preferably no additional emulsifiers are added to the dispersions for use in accordance with the invention.

The polymerization is conducted preferably in the presence of compounds which form free radicals (initiator compounds). The amount required of these compounds is preferably from 0.05 to 10%, more preferably from 0.2 to 5% by weight, based on the monomers used in the polymerization.

Examples of suitable polymerization initiators are peroxides, hydroperoxides, peroxodisulfates, percarbonates, peroxo esters, hydrogen peroxide, and azo compounds. Examples of initiators, which may be soluble or else insoluble in water, are hydrogen peroxide, dibenzoyl peroxide, dicyclohexyl peroxydicarbonate, dilauroyl peroxide, methyl ethyl ketone peroxide, di-tert-butyl peroxide, acetylacetone peroxide, tert-butylhydroperoxide, cumene hydroperoxide, tert-butyl perneodecanoate, tert-amyl perpivalate, tert-butyl perpivalate, tert-butylperneohexanoate, tert-butyl per-2-ethylhexanoate, tert-butyl-perbenzoate, lithium, sodium, potassium, and ammonium peroxodisulfates, azodiisobutyronitrile, 2,2'-azobis(2-amidinopropane) dihydrochloride, 2-(carbamoylazo)isobutyronitrile, and 4,4-azobis (4-cyanovaleric acid). The known redox initiator systems as well, such as $H_2O_2$/ascorbic acid or t-butyl hydroperoxide/sodium hydroxymethanesulfinate, can be used as polymerization initiators.

The initiators can be employed alone or in a mixture with one another, an example being mixtures of hydrogen peroxide and sodium peroxodisulfate. For polymerization in aqueous medium it is preferred to use water-soluble initiators.

In order to prepare polymers having a low average molecular weight it is often advantageous to carry out the copolymerization in the presence of regulators. For this purpose it is possible to use customary regulators, such as organic SH-containing compounds, for example, such as 2-mercaptoethanol, 2-mercaptopropanol, mercaptoacetic acid, tert-butyl mercaptan, n-octyl mercaptan, n-dodecyl mercaptan, and tert-dodecyl mercaptan, hydroxylammonium salts such as hydroxylammonium sulfate, formic acid, sodium bisulfite or isopropanol. The polymerization regulators are used generally in amounts of from 0.05 to 5% by weight, based on the monomers.

In order to prepare copolymers of high molecular mass it is often advantageous to operate in the presence of crosslinkers during the polymerization. Such crosslinkers are compounds having two or more ethylenically unsaturated groups, such as diacrylates or dimethacrylates of at least dihydric saturated alcohols, such as, for example, ethylene glycol diacrylate, ethylene glycol dimethacrylate, 1,2-propylene glycol diacrylate, 1,2-propylene glycol dimethacrylate, butane-1,4-diol diacrylate, butane-1,4-diol dimethacrylate, hexanediol diacrylate, hexanediol dimethacrylate, neopentyl glycol diacrylate, neopentyl glycol dimethacrylate, and 3-methylpentanediol diacrylate and 3-methylpentanediol dimethacrylate. The acrylic and methacrylic esters of alcohols having more than 2 OH groups can also be used as crosslinkers, e.g., trimethylolpropane triacrylate or trimethylolpropane trimethacrylate. Another class of crosslinkers are diacrylates or dimethacrylates of polyethylene glycols or polypropylene glycols having molecular weights of in each case from 200 to 9,000.

Aside from the homopolymers of ethylene oxide or propylene oxide it is also possible to use block copolymers of ethylene oxide and propylene oxide or copolymers of ethylene oxide and propylene oxide containing the ethylene oxide and propylene oxide units in random distribution. The oligomers of ethylene oxide and/or propylene oxide, as well, are suitable for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers include vinyl acrylate, vinyl methacrylate, vinyl itaconate, divinyl adipate, butanediol divinyl ether, trimethylolpropane trivinyl ether, allyl acrylate, allyl methacrylate, pentaerithritol triallyl ether, triallylsucrose, pentaallylsucrose, methylenebis(meth)acrylamide, divinylethyleneurea, divinylpropyleneurea, divinylbenzene, divinyldioxane, triallyl cyanurate, tetraallylsilane, tetravinylsilane, and bis- or polyacrylosiloxanes (e.g., Tegomers® from Th. Goldschmidt AG). The crosslinkers are used preferably in amounts of from 10 ppm up to 5% by weight, based on the monomers to be polymerized.

Crosslinking accelerators which can be used include phosphorus compounds, especially phosphorous and hypophosphorous acids and their salts.

As well as the constituents mentioned, the aqueous polymer dispersions may contain customary additions in accordance with the intended application.

The components optionally present additionally in the aqueous polymer dispersion are normally added after the end of the emulsion polymerization.

To modify various property features of the aqueous polymer dispersions for use in accordance with the invention they may also be mixed with one or more other polymer dispersions, polymer solutions or polymer powders.

A further possibility for modification is the admixing of further co-components, including organic components, such as epoxy-functional components, formaldehyde resins, components containing isocyanate groups or urethane groups, amino-, carboxy- or hydroxy-functionalized mono- or disilane and/or -siloxane compounds, or other, substituted or unsubstituted hydrocarbon compounds.

Furthermore, it is also possible to add inorganic components to the aqueous polymer dispersions (fillers, rheological additives, adhesion promoters, crosslinking accelerators, etc.). Examples include pigments, fillers, salts, and oxides.

Where necessary, the polymer dispersions for use in accordance with the invention may also include two or more of the aforementioned co-components at one and the same time.

The aqueous polymer dispersions may further comprise customary additions in accordance with the intended application. By way of example it may contain bactericides or fungicides. Further they may comprise hydrophobicizing agents for increasing the water resistance of the treated substrates. Suitable hydrophobicizing agents are customary aqueous paraffin dispersions or silicones. The compositions may further comprise wetting agents, thickeners, plasticizers, retention agents, pigments, and fillers. One way in which these fillers can be mixed in is by induction heating, which facilitates the curing process.

Over and above this it can be advisable, for more rapid crosslinking at lower temperatures, to add certain epoxide compounds as well, examples being difunctional or trifunctional glycidyl ethers such as bisphenol A diglycidyl ether or butanediol diglycidyl ether, i.e., in particular, aromatic and aliphatic glycidyl ethers. Suitable epoxide compounds, additionally, are cycloaliphatic glycidyl compounds, heterocyclic glycidyl compounds, and cycloaliphatic epoxy resins.

Finally, the aqueous polymer dispersions may comprise customary flame retardants, such as aluminum silicates, aluminum hydroxides, borates and/or phosphates.

Frequently the aqueous polymer dispersions also contain coupling reagents, such as alkoxysilanes, e.g., 3-aminopropyltriethoxysilane, soluble or emulsifiable oils as lubricants and dust-binding agents, and also wetting assistants.

The aqueous polymer dispersions can also be used in a blend with other binders, such as urea-formaldehyde resins, melamine-formaldehyde resins or phenol formaldehyde resins, and also with epoxy resins.

The aqueous polymer dispersions are formaldehyde-free. Formaldehyde-free means that the compositions of the invention contain no significant amounts of formaldehyde and that no significant amounts of formaldehyde are released on drying and/or curing either. In general the compositions contain <100 ppm formaldehyde.

The formaldehyde-free aqueous polymer dispersions are substantially uncrosslinked and therefore thermoplastic prior to application. If necessary, however, a small degree of precrosslinking of the polymer A1 can be attained, by the use of monomers having two or more polymerizable groups, for example.

The aqueous dispersions for use in accordance with the invention are composed essentially of finely divided emulsion polymer particles of A1 and an aqueous phase containing the polymer A2 and also any amine added separately or unreacted in the esterification, and also, where appropriate, further, water-soluble additives, e.g., crosslinkers.

It is also possible for superordinate structures to form in the aqueous phase, such as lyotropic phases formed by lamellar or spherical aggregates, for example.

The monomer composition is generally so chosen that for the polymer A1 the resultant glass transition temperature, Tg, is in the range from −60° C. to +150° C. The glass transition temperature, Tg, of the polymers can be determined in a known way, for example, by means of differential scanning calorimetry (DSC). The Tg can also be calculated approximately by means of the Fox equation. According to Fox T. G., Bull. Am. Physics Soc. 1,3, page 123 (1956) it is the case that: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in kelvins, of the homopolymer of the monomer n. Tg values for homopolymers are listed in Polymer Handbook 3rd Edition, J. Wiley & Sons, New York (1989). For further processing to filter materials the glass transition temperature is preferably within a range from −50 to +90° C.

The aqueous polymer dispersions for use in accordance with the invention are finely divided, stable latices. The weight-average particle size of the latex particles is approximately from 10 to 1 500 nm, preferably from 20 to 1 000 nm, more preferably from 30 to 500 nm, as measured by means of an analytical ultracentrifuge (AUC).

The aqueous polymer dispersions for use in accordance with the invention can be diluted ad infinitum with water or with dilute salt or surfactant solutions without causing the latex particles to coagulate. They have a nonvolatiles content (solids content) in the range from about 20 to 75% by weight, preferably 25 to 65% by weight. The viscosity (for a solids content of 40% by weight) is generally within a range from about 10 to 4 000 mPas, as measured with a rotational viscometer in accordance with DIN 53019 at 23° C. and at a shear rate of 250 $s^{-1}$.

The aqueous polymer dispersions for use in accordance with the invention can also be diluted with water before being added to the filter material. It may further be advantageous to apply the aqueous polymer dispersions as a blend with water-compatible solvents such as alcohols, especially methanol, ethanol or the like. The aqueous polymer dispersions are particularly compatible with these solvents. Application from the aqueous phase, however, constitutes a further advantage of the binder dispersion of the invention over solventborne systems.

The aqueous polymer dispersions described are used in accordance with the invention as binders for producing filter materials, especially filter papers or filter cloths. Examples of possible cloth materials include cellulose, cotton, polyester, polyamide, PE, PP, glass nonwovens, and glass wool. It can be advisable to adjust the aqueous polymer dispersions to a pH of from 2 to 8, in particular from 3.0 to 6.5, before applying them to the corresponding paper or cloth, by addition of various organic or inorganic bases. Suitable bases include triethanolamine, diethanolamine, monoethanolamine, hydroxyalkylamines, ammonia, organic monofunctional or polyfunctional amines, alkoxides, and metal alkyl compounds, but also inorganic bases such as sodium or potassium hydroxide solutions. The adjustment of the pH to the stated range of values has the effect, among others, of reducing the fall in bursting strength following storage or thermal exposure and hence of achieving a high thermal stability.

Application of the polymer dispersion for inventive use to the filter materials, i.e., to filter paper or filter cloth, inter alia, is accomplished preferably by the impregnating method or by spraying. In this case the aqueous polymer dispersions are applied to the filter materials by resination. After the filter materials have been resinated with the aqueous polymer dispersions it is advisable to cure them by heating at from 100 to 250° C., in particular from 110 to 220° C., for from 0.1 to 60 minutes, in particular from 1 to 60 minutes.

The inventive use of the aqueous polymer dispersion as a binder for filter materials means that the treated filter materials have, among other qualities, an enhanced mechanical stability (higher tensile strength and bursting strength), especially after storage under damp conditions and at elevated temperature. The inventive use of the aqueous binders also has the effect that the resultant filter materials are characterized by qualities including high chemical resistance, to solvents for example, without any effect on the permeability (pore size) of the filter material. Through the use of the aqueous polymer dispersions it is also observed that they give the filter materials a high strength even after drying (dry tensile strength), and yet after drying below the curing temperature of the aqueous polymer dispersions the filter materials can still be readily subjected to deformation by folding, grooving or pleating. Following subsequent thermal curing (heat treatment) the polymer dispersions give the resultant and likewise inventive filter materials, primarily filter papers or filter cloths, a high dimensional stability. This quality makes it possible to produce semi-finished products and so to break down the manufacturing operation into individual, independent production steps.

EXAMPLES

I. Preparation of a Polymer Dispersion for Inventive Use
Example 0 (Preparation of the Carboxyl-Containing Polymer A2)

A pressure reactor with anchor stirrer was charged with 0.55 kg of fully deionized water, 0.36 kg of maleic anhydride and 0.91 kg of a 40% strength by weight aqueous solution of an ethoxylated oleylamine (average degree of ethoxylation =12, e.g., Lutensol FA grades from BASF AG). This initial charge was heated to 125° C. under a nitrogen atmosphere. When this temperature had been reached, feed stream 1, composed of 0.75 kg of fully deionized water and 1.00 kg of acrylic acid, and feed steam 2, composed of 0.22 kg of fully deionized water and 0.12 kg of $H_2O_2$ (30% strength by weight), were metered in at a uniform rate, feed stream 1 over the course of 4 h and feed stream 2 over the course of 5 h. After the end of feed stream 1a further 0.11 kg of fully deionized water was added. After the end of the reaction the solution was cooled to room temperature. The aqueous polymer solution obtained has a solids content of 43.0%, a pH of 1.7, and a viscosity of 450 mPas. The K value (determined by the Fikentscher method) is 13.3.

The nonvolatiles (SC=solids content) were determined in a forced-air drying cabinet from the weight loss of a 1 g sample dried at 120° C. for two hours.

The viscosity of the dispersions was determined in a Rheomat from Physica at a shear rate of 250 $s^{-1}$ in accordance with DIN 53019 at 23° C. The K value was determined by the Fikentscher method in accordance with DIN 53276.

The pH was determined using a handylab 1 pH meter from Schott.

Example 1 (E1)

A 4 l glass vessel with anchor stirrer (120 rpm) was charged with 372 g of water and 10% by weight of a feed stream 4 and this initial charge was heated to 85° C. After 2 minutes at this temperature a feed stream 3 was metered in over the course of 3 h and the remainder of feed stream 4 was metered in over the course of 3.5 h, the two feeds being introduced at different locations. Postpolymerization was then carried out at this temperature for 30 minutes more and the reaction mixture was cooled. The polymer dispersion thus prepared contains 50.3% by weight nonvolatiles and has a pH of 2.1. The viscosity of the polymer dispersion obtained is 982 mPas (250 $s^{-1}$). Then 314 g of an aqueous solution (50% by weight) of 2,2',2"-nitrilo-triethanol were added. The pH of the mixture is adjusted to 6.0 using aqueous $NH_3$ solution.

Feed Stream 3:

1308 g of the carboxyl-containing polymer from Example 0 (43% strength by weight)

525 g of styrene 188 g of methyl methacrylate 38 g of 2-hydroxyethyl acrylate

Feed Stream 4:

1003 g of fully deionized water
7.5 g of sodium peroxodisulfate

Examples 2 to 4 were prepared in analogy to Example 1 using the stated polymer/monomer combinations, i.e., the stated copolymer was polymerized on in the presence of the carboxyl-containing polymer A2 from Example 0 (Table I)

TABLE I

| Copolymer | A2 [pphm] | Tg (calc.) [° C.] | SC [%] | Viscosity [mPas, 250 s$^{-1}$] | pH |
|---|---|---|---|---|---|
| Example 1 (E1) (70S/25MMA/5HEA) | 100 | 96 | 51.7 | 541 | 3.6 |
| Example 2 (E2) (95BA/5HEA) | 100 | −43 | 51.2 | 924 | 3.6 |
| Example 3 (E3) (50S/45BA/5HEA) | 100 | 14 | 51.1 | 819 | 3.5 |
| Example 4 (E4) (50S/45BA/5HEA) | 25 | 14 | 49.5 | 179 | 3.5 |

Abbreviations:
S: styrene
MMA: methyl methacrylate
HEA: hydroxyethyl acrylate
BA: n-butyl acrylate
A2 [pphm]: parts per hundred monomers, fraction of polymer A2 relative to A1
Tg (calc.): calculated glass transition temperature
SC: solids content II. Resination of Filter Papers Using the Polymer Dispersion Obtained from Section I The polymer dispersions prepared in I were used to resinate filter papers in an impregnating process (paper grade 105 g/m$^2$, application weight 20% by weight), which were dried at 50° C. for five minutes and then heated at 180° C. for three minutes. The air permeability was determined by means of an Akustron from W. Westerteiger Messgeräte Akustron by a method based on DIN 53887 or DIN 53120 and ISO 9237. The tensile strength (ultimate tensile force) was determined using a tensile tester from Zwick, model Z 2,5/TN1S. The bursting pressure was determined in accordance with ISO 2758.

Table II below shows the bursting pressure to DIN ISO 2758 and the air permeability of the filter materials produced, for inventive Examples 1 and 3, in comparison to base paper and with a binder standard (Bakelite 9599).

In Table II

+30% ff epoxy: means additionally 30% by weight of an epoxy dispersion

+30% ff PU: means additionally 30% by weight of a polyurethane dispersion

+1% ff silane: means additionally 1% by weight of an aminopropyltrimethoxysilane.

The inventive dispersions prepared in I were used to resinate filter papers in an impregnating process (paper grade 105 g/m$^2$, application weight 20% by weight), which were dried at 50° C. for five minutes and then heated at 180° C. for three minutes.

The air permeability was determined by means of an Akustron from W. Westerteiger Messgeräte Akustron by a method based on DIN 53887 or DIN 53120 and ISO 9237. The tensile strength (ultimate tensile force) was determined using a tensile tester from Zwick, model Z 2,5/TN1S. The bursting pressure was determined in accordance with ISO 2758.

Table II compares a standard binder (PF resin) with the inventive examples and blends thereof with various adjuvants;*) epoxy=epoxy resin of the bisphenol A type,) PU=polyurethane dispersion, Emuldur DS 2361,*) silane=functionalized silane component Silquest A-1100

TABLE II

| Product ID: | Base paper | Base paper | Bakelite 9599 | E1 | E3 | Ex. 1 + 30% f/f epoxy* | Ex. 1 + 30% f/f PU** | Ex. 1 + 1% f/f silane*** | Ex. 3 + 30% f/f epoxy* | Ex. 3 + 30% f/f PU** | Ex. 3 + 1% f/f silane*** |
|---|---|---|---|---|---|---|---|---|---|---|---|
| Filter material tests | | | | | | | | | | | |
| Methanol fraction [%] Drying 5 min at 59° C., curing 3 min at 180° C. | | 100 | 100 | 80 | 80 | 80 | 80 | 80 | 80 | 80 | 80 |
| Bursting pressure | | | | | | | | | | | |
| Dry (kPa) | 45 | 45 | 303 | 300 | 339 | 370 | 311 | 318 | 386 | 371 | 347 |
| Akustron air permeability | | | | | | | | | | | |
| Dry (mm/s) | 971 | 971 | 986 | 927 | 958 | 845 | 934 | 953 | 953 | 953 | 942 |

With the binders of the invention, in comparison to PF resins, a high dry strength of the filter materials is achieved already after drying (without curing). Curing can take place at a later point in time (for example, after further processing steps), and achieves a strength level which matches that achieved after direct curing (Table III).

Table III reports further bursting pressure results for inventive Examples 1 and 3.

TABLE III

|  | Product ID: | | |
|---|---|---|---|
|  | E3 | E3 | Bakelite 9599 |
| Disp. number: | | | |
| Filter material tests | Filter paper 105 g/m² | | |
| Methanol fraction in % | | | |
| drying 5 min 50° C. curing 3 min 180° C. Bursting pressure | 80 | 80 | 100 |
| 5 min 50° C. (kPa) Bursting pressure | 300 | 300 | 147 |
| curing 3 min 180° C. after 4 weeks of storage at RT (kPa) | 294 | 315 | 320 |

Table IV illustrates the fact that the polymer dispersions of the invention can be applied from the aqueous phase even in the absence of organic solvents such as methanol.

An occasional observation with cellulosic filter materials is a drop in strength on long-term storage or storage at elevated temperature. When the binders of the invention are employed within a certain pH range, preferably 3–8, more preferably 3.5–6.5, it is possible to counter the drop in bursting pressure on storage at elevated temperature. The pH can be adjusted using volatile and/or nonvolatile organic and/or inorganic bases, but preferably with nonvolatile organic and/or inorganic bases (e.g., NaOH, KOH, $N(CH_2CH_2OH)_3$, $N(CH_2CH_3)_3$, $N(CH_2CH_3)_2$, $N(CH_2CH_3)$).

TABLE IV

|  | Product ID: | | | |
|---|---|---|---|---|
|  | E1 | E3 | E1 + NaOH | E3 + NaOH |
| Filter material tests | | | | |
| pH in water Application from aqueous phase, | 3.6 | 3.5 | 6 | 6 |
| drying 5 min at 50° C., curing 3 min at 180° C. Bursting pressure | | | | |
| dry (kPa) Bursting pressure | 218 | 220 | 273 | 231 |
| after 24 h at 160° C. (kPa) | 98 | 99 | 170 | 171 |

We claim:

1. A filter material treatment process comprising:
   resinating a filter material with an aqueous polymer dispersion comprising dispersed particles of at least one polymer A1 obtained by free-radical emulsion polymerization in the presence of a polymer A2 to form a resinated filter material, and
   curing the resinated filter material;
   wherein the polymer A2 comprises:
   (i) polymerized units of from 50 to 99.5% by weight of at least one of an ethylenically unsaturated monocarboxylic acid and an ethylenically unsaturated dicarboxylic acid,
   (ii) from 0.5 to 50% by weight of at least one ethylenically unsaturated compound having an amine containing at least one hydroxyl group selected from the group consisting of an ester of an ethylenically unsaturated monocarboxylic acid, a monoester of an ethylenically unsaturated dicarboxylic acid, and a diester of an ethylenically unsaturated dicarboxylic acid, and
   (iii) up to 20% by weight of at least one further monomer.

2. The process of claim 1, wherein the curing is carried out by heating the resinated filter material.

3. The process of claim 2, wherein the heating is carried out at a temperature of from 100 to 250° C. for from 0.1 to 60 minutes.

4. The process of claim 1, wherein the filter material is a filter paper or a filter cloth.

5. The process of claim 1, wherein the pH of the aqueous polymer dispersion is from 2 to 8.

6. The process of claim 1, wherein the pH of the aqueous polymer dispersion is from 3.0 to 6.5.

7. The process of claim 1, wherein the aqueous polymer dispersion further comprises a base.

8. The process of claim 1, wherein the pore size of the filter material and the cured, resinated filter material is the same.

9. The process of claim 1, wherein the air permeability of the filter material measured by ISO 9237 does not decrease by more than 13% after the resinating and the curing.

10. The process of claim 1, wherein the permeability of the filter material measured by ISO 9237 does not decrease by more than 1% after the resinating and the curing.

11. The process of claim 1, wherein the permeability of the filter material measured by ISO 9237 does not decrease by more than 4% after the resinating and the curing.

12. The process of claim 1, wherein the resinating is carried out in the absence of organic solvents.

13. The process of claim 1, wherein the polymer A2 comprises polymerized units of at least one of an ethylenically unsaturated monocarboxylic acid and an ethylenically unsaturated dicarboxylic acid; and at least one compound selected from the group consisting of a $C_3$–$C_{10}$ monocarboxylic acid and a $C_4$–$C_8$ dicarboxylic acid.

14. The process of claim 1, wherein the polymer A2 comprises at least one ethylenically unsaturated compound having an amine containing at least one hydroxyl group selected from the group consisting of a monoester of an ethylenically unsaturated dicarboxylic acid with an amine and a diester of an ethylenic ally unsaturated dicarboxylic acid,
   wherein the amine containing at least one hydroxyl group is at least one amine of formula (I):

$$R^c NR^a R^b \qquad (I)$$

wherein $R^c$ is at least one of a $C_6$ to $C_{22}$ alkyl, a $C_6$ to $C_{22}$ alkenyl, an aryl-$C_6$–$C_{22}$ alkyl or an aryl-$C_6$–$C_{22}$ alkenyl, wherein the alkenyl radical may have 1, 2 or 3 nonadjacent double bonds,
   $R^a$ is at least one of a hydroxy-$C_1$–$C_6$ alkyl or a radical of formula II $$-(CH_3CH_2O)_x(CH_2CH(CH_3)O)_y-H \qquad II$$

wherein the sequence of the alkylene oxide units is arbitrary and x and y independently are an integer from 0 to 100, and the sum of x and y is >1,
   $R^b$ is at least one of hydrogen, a $C_1$ to $C_{22}$ alkyl, a hydroxy-$C_1$–$C_6$ alkyl, a $C_6$ to $C_{22}$ alkenyl, an aryl-$C_6$–$C_{22}$ alkyl, an aryl-$C_6$–$C_{22}$ alkenyl or $C_5$ to $C_8$ cycloalkyl, wherein the alkenyl radical may have 1, 2 or 3 nonadjacent double bonds, or $R^b$ is a radical of formula III $$—(CH_2CH_2O)_v(CH_2CH(CH_3)O)_w—H \qquad (III)$$

wherein the sequence of the alkylene oxide units is arbitrary and v and w independently are an integer from 0 to 100.

15. The process of claim 1, wherein the weight ratio of polymer A1 to polymer A2 based on the solid weight of polymer A1 and polymer A2 is from 9:1 to 1:9.

16. The process of claim 1, wherein the weight ratio of polymer A1 to polymer A2 based on the solid weight of polymer A1 and polymer A2 is from 3:1 to 1:3.

17. The process of claim 1, wherein the aqueous polymer dispersion further comprises an alkanolamine crosslinker having at least two hydroxyl groups.

18. The process of claim 1, wherein the aqueous polymer dispersion comprises an inorganic component.

19. The process of claim 1, wherein the resinating is carried out by impregnating the filter material with the aqueous polymer dispersion.

20. The process of claim 1, wherein the resinating is carried out by spraying the aqueous polymer dispersion onto the filter material.

21. A resinated, cured filter material obtained by the process as claimed in claim 1.

22. The process of claim 1, further comprising:
passing a particulate-containing fluid through the cured, resinated filter material to remove the particulate from the fluid and provide a filtered fluid.

* * * * *